United States Patent [19]
Dibert, Jr. et al.

[11] Patent Number: 4,610,489
[45] Date of Patent: Sep. 9, 1986

[54] MEDICINE CABINET ASSEMBLY AND METHOD OF MOUNTING SAME

[75] Inventors: Grant Dibert, Jr., Ft. Thomas; David Shelton, Union, both of Ky.

[73] Assignee: Kent Subsidiary of Kidde Inc., Bellevue, Ky.

[21] Appl. No.: 708,789

[22] Filed: Mar. 6, 1985

[51] Int. Cl.[4] ........................ A47B 67/00; A47G 1/16; E05D 7/10; B23P 11/00

[52] U.S. Cl. .................................... 312/227; 248/489; 16/262; 29/434

[58] Field of Search ............... 312/209, 227, 224, 245, 312/206, 106; 16/262, 366; 29/434, 526 R; 248/489, 455

[56] References Cited

U.S. PATENT DOCUMENTS

| | | | |
|---|---|---|---|
| 1,835,042 | 12/1931 | Hammer | 312/227 |
| 1,916,509 | 7/1933 | Hammer | 312/245 |
| 2,440,549 | 4/1948 | Kiser | 312/245 |
| 3,909,091 | 9/1975 | Tantillo | 312/227 |
| 4,437,639 | 3/1984 | Stein | 248/489 |

*Primary Examiner*—William E. Lyddane
*Assistant Examiner*—Gerald A. Anderson
*Attorney, Agent, or Firm*—Frost & Jacobs

[57] ABSTRACT

A medicine cabinet assembly has a removable closure member which is readily installed to a cabinet body after the cabinet body has been secured to the wall by inserting a pair of downwardly depending mounting pins secured to the closure member into a correspondingly spaced and sized pair of apertures defined in hinge leaves secured to the cabinet body.

2 Claims, 14 Drawing Figures

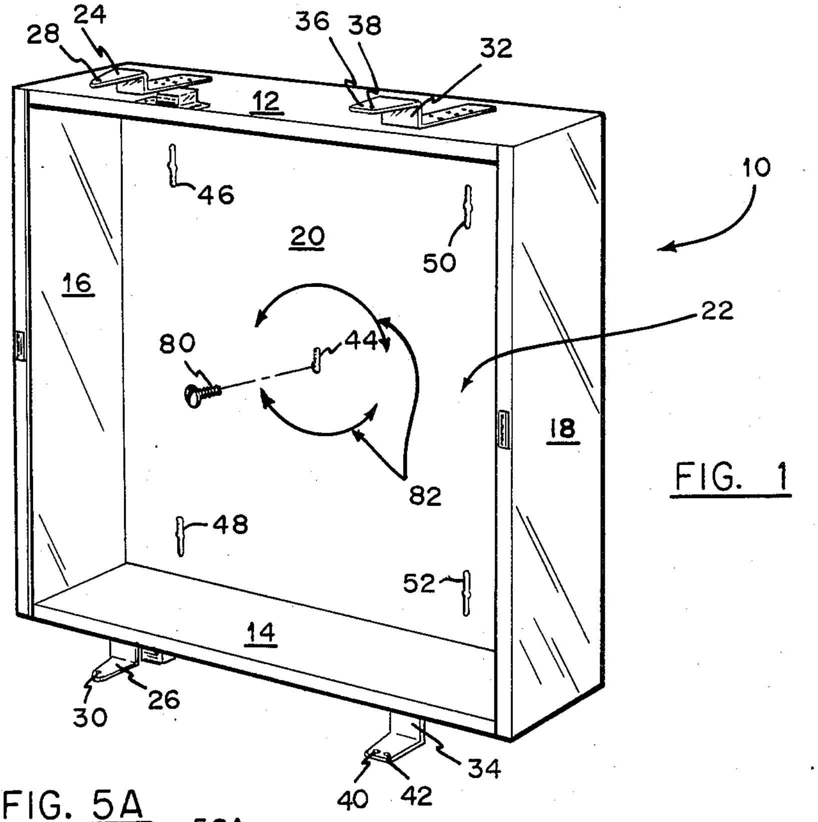
FIG. 1
FIG. 5A
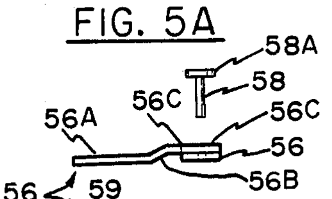
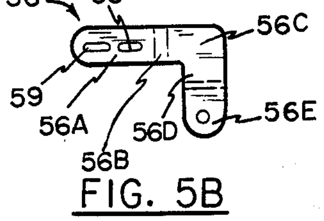
FIG. 5B
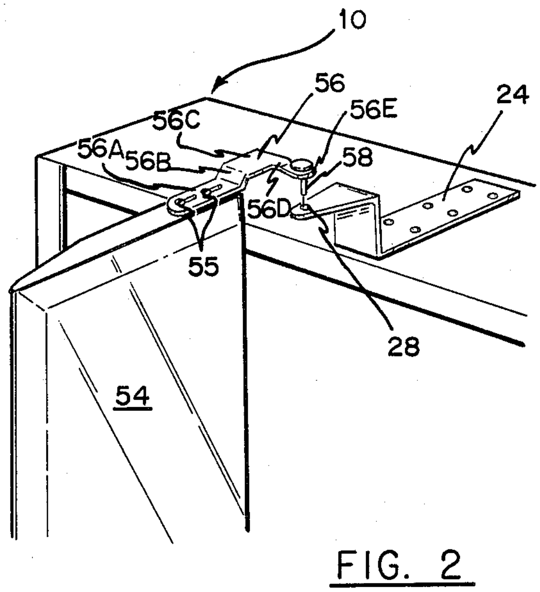
FIG. 2

FIG. 6A
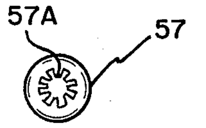
FIG. 6B
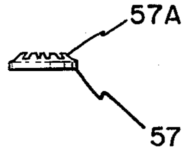
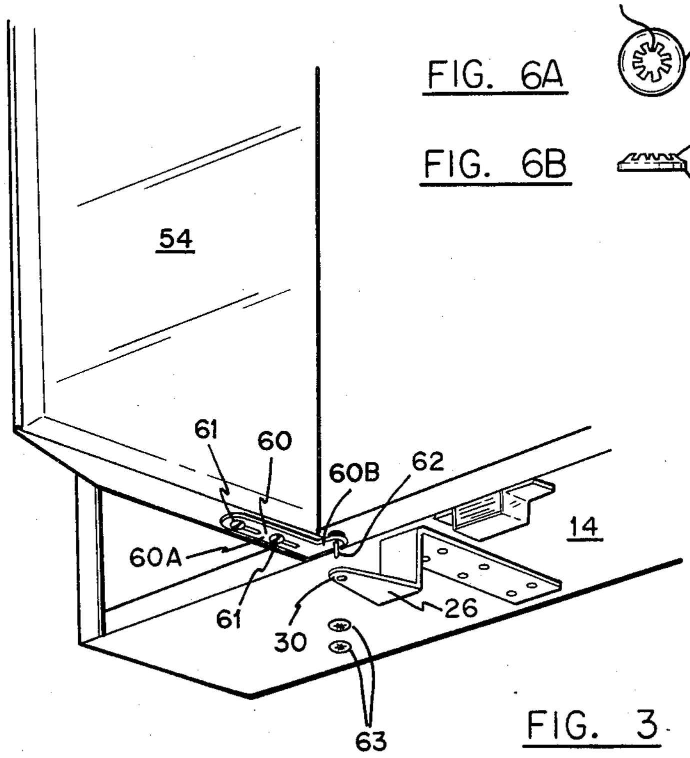
FIG. 3
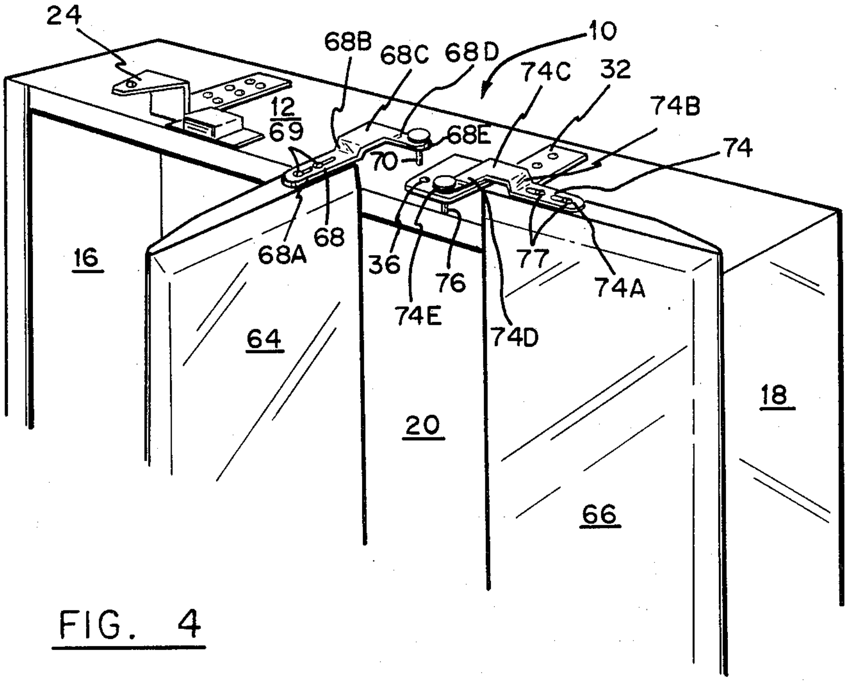
FIG. 4

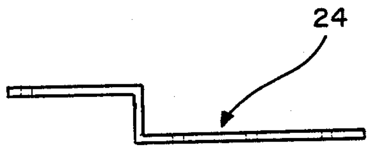
FIG. 7A
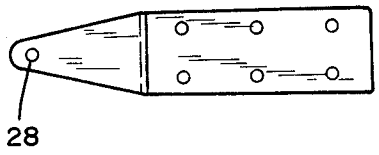
FIG. 7B
FIG. 8A
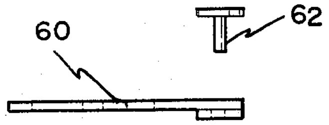
FIG. 8B
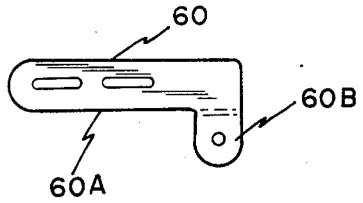
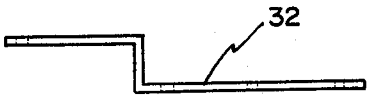
FIG. 9A
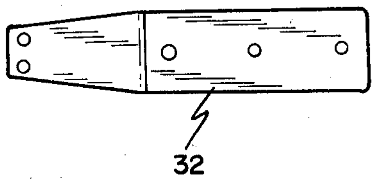
FIG. 9B

MEDICINE CABINET ASSEMBLY AND METHOD OF MOUNTING SAME

TECHNICAL FIELD

The invention relates generally to medicine cabinets and more particularly concerns an easily installed medicine cabinet assembly having a removable closure member. The invention will be specifically disclosed in connection with a mirrored closure member having a pair of downwardly depending mounting pins which are removably inserted into corresponding apertures secured to the cabinet body and which are used to pivotally mount the closure member.

BACKGROUND OF THE INVENTIOn

It is most common for present day homes to have at least one medicine cabinet in the bathroom or other area of the house for the storage of medicines or personal items. Medicine cabinets are usually mounted on vertical wall surfaces several feet above a sink or vanity. The typical medicine cabinet assembly includes a cabinet body having top, bottom, side and rear surfaces with an open front. The front opening of the cabinet is usually closed by a mirrored door mounted to the cabinet body about hinges, and the door is pivotally movable about these hinges to selectively open and close the front opening. A plurality of spaced horizontal storage shelves are also generally disposed within the cabinet body.

A typical medicine cabinet assembly of approximately 30"×30"×3" in size weighs approximately 60 pounds. When such a medicine cabinet is installed on a vertical wall surface, this considerable assembly weight creates difficulties for the installer who must support the assembly as it is being precisely positioned and mounted to a desired height and orientation. The difficulty of supporting the assembly is further increased when the assembly is being positioned above a sink or vanity which prevents the installer from positioning his body beneath the weight of the assembly.

Significantly, the majority of the assembly weight resides in the mirrored door or doors. In the typical 60 pound cabinet assembly described above, for example, the mirrored door would entail approximately 45 pounds of the total assembly weight. The remaining portions of the assembly, the shelves and the cabinet body, have a combined weight of only approximately 15 pounds. Hence, most of the installer's positioning and mounting difficulties are precipitated not by the weight of the cabinet body which must be secured to the wall surface, but by the weight of the doors which are hinged to the cabinet body. However, inasmuch as the closure members of prior art medicine cabinets have generally been either permanently hinged to the cabinet body or relatively difficult to disassemble, installers of these assemblies have, as a practical matter, been relegated to supporting the entire assembly weight during installation.

The considerable weight of the medicine cabinet assembly also compounds the difficulties in leveling a cabinet on a vertical wall. Most modern cabinet assemblies are installed by inserting mounting screws into the vertical wall through apertures in the rear surface of the cabinet body. In order to accommodate such installation, prior art cabinet bodies have included apertures in the four corners of the rear surface. The cabinet is first lifted into its desired position. Once leveled, the position of the four apertures are marked on the wall through the rear of the cabinet body. The cabinet assembly is then returned to the floor and screws are started into the marked locations on the wall. As noted above, the cabinet assembly is frequently installed above a sink or vanity which prevents the installer from positioning his body beneath the supported cabinet assembly. This makes installation of the assembly more difficult. Also, the open door(s) of the assembly inevitably swing about their hinges as the assembly is moved to further complicate installation. The method of installing cabinet assemblies of the prior art is so cumbersome, in fact, that two or more people are usually required.

SUMMARY OF THE INVENTION

Accordingly, it is a primary object of the present invention to provide a medicine cabinet assembly which is easily and readily installed upon a vertical wall.

It is another object of the invention to provide a medicine cabinet assembly for removably mounting a pivotal closure member on a cabinet body.

Still another object of the invention is to provide an improved method of installing medicine cabinet assemblies onto vertical walls.

Additiional objects, advantages and other novel features of the invention will be set forth in part in the description that follows and in part will become apparent to those skilled in the art upon examination of the following, or may be learned by the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a medicine cabinet assembly is provided with a closure member which is readily hingedly attachable to a cabinet body after the cabinet body has been installed upon a vertical wall. The assembly includes a cabinet body having top, bottom, side and rear surfaces. A front opening extends between the top, bottom and side surfaces in substantially parallel relationship to the rear surface. First and second hinge leaf means are secured to the top and bottom cabinet body surfaces respectively for mounting a removable closure member. This removable closure means is supported upon the hinge leaf means and is operative to selectively close and open the front opening of the cabinet body. First and second mounting means are secured to the closure means and spaced in correspondency to the first and second hinge leaf means to support the closure means on the cabinet body. Each of the mounting means includes a downwardly depending mounting pin which is pivotally and removably disposable within one of a series of vertically aligned apertures in the hinge leaf means. The closure means of the invention may be removed from the cabinet by elevating the closure means with respect to the body and lifting the mounting pins out of the apertures.

In accordance with another aspect of the invention, the closure means includes a door with a mirror surface.

In yet another aspect of the invention, the positions of the downwardly depending mounting pins are adjustable with respect to the closure member so as to permit relative movement between the closure means and the pivotal axis connecting the closure means to the cabinet body.

In yet another aspect of the invention, the first mounting means is secured to the top portion of the closure means and the second mounting means is secured to the bottom portion thereof.

In yet another aspect of the invention, one of the mounting pins is longer than the other to permit insertion of the longer mounting pin into the corresponding aperture prior to insertion of the shorter of the mounting pins into the other corresponding aperture.

In accordance with one specific aspect of the invention, the mounting pin depending downwardly from the first mounting means is longer than the pin depending downwardly from the second mounting means.

In another aspect of the invention, the first mounting means includes a hinge having a first portion contacting the door and a second portion spaced above the door. The downwardly depending mounting pin extends downwardly from the second portion and the space between the second portion and the door is used to accommodate the first hinge leaf means.

According to a further aspect of the invention, the closure means includes a plurality of individual doors. Each of the doors is individually hinged to the cabinet body about a pair of downwardly depending pins secured to the top and bottom portions of the respective doors.

In yet another aspect of the invention, at least two of the doors are hinged about parallel axes proximal to adjacent sides of adjacent doors.

In yet a further aspect of the invention, at least two of the doors are hinged about a common hinge leaf.

According to another feature of the invention, the rear surface of the cabinet body has a centrally disposed aperture with a plurality of additional apertures offset from the centrally disposed aperture. The centrally disposed aperture preferably has a single keyhole configuration.

In still a further aspect of the invention, a method is provided for installing a medicine cabinet. The method includes installing a cabinet body by partially inserting a mounting screw into a vertical wall at a predetermined position so that the head of the mounting screw is spaced from the wall. The cabinet body is then hung upon the wall by inserting the mounting screwhead through a center aperture in the rear surface of the cabinet body. The cabinet body member is leveled by rotating the cabinet body about the mounting screw in the center aperture. Once leveled, a screw is inserted through at least one additional off-center aperture in the rear surface of the cabinet body. The closure member is installed on the cabinet body for selectively opening and closing the front opening of the cabinet body only after the body is secured to the wall.

In another aspect of the invention, the closure member is installed upon the cabinet body by directing downwardly depending pins extending from the closure means into spaced apertures formed in hinge leaves secured to the cabinet body.

Still other objects of the present invention will become readily apparent to those skilled in this art from the following description wherein there is shown and described a preferred embodiment of this invention, simply by way of illustration of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification illustrate several aspects of the present invention, and together with the description serve to explain the principles of the invention. In the drawings:

FIG. 1 is a perspective view of a cabinet body for a medicine cabinet assembly constructed in accordance with the principles of the present invention;

FIG. 2 is an enlarged perspective view of the top left hand corner of the cabinet body of FIG. 1 depicting a top portion of one of a plurality of doors to be mounted to the cabinet body;

FIG. 3 is a perspective view of the left hand bottom corner of the cabinet body of FIG. 1 depicting a bottom portion of the door shown in FIG. 2 as the door is about to be mounted onto the cabinet body;

FIG. 4 is a perspective view of the top portion of the cabinet body of FIG. 1 showing one mounted door and one door about to be mounted onto the cabinet body;

FIG. 5*a* is a side elevational view of the adjustable hinge leaf assembly used at the top of the door illustrated in FIG. 2;

FIG. 5*b* is a plan view of the hinge leaf or FIG. 5*a;*

FIG. 6*a* is a side elevational view of the push nut depicited in FIG. 3;

FIG. 6*b* is a plan view of the push nut of FIG. 6*a;*

FIG. 7*a* is a side elevational view of the hinge leaf secured to the top of the cabinet body in FIG. 2;

FIG. 7*b* is a plan view of a hinge leaf of FIG. 7*a;*

FIG. 8*a* is a side elevational view of the adjustable hinge leaf assembly secured to the bottom of the door illustrated in FIG. 3;

FIG. 8*b* is a plan view of the hinge leaf of FIG. 8*a;*

FIG. 9*a* is a side elevational view of the hinge leaf secured to the right top surface of the cabinet body illustrated in FIG. 4; and FIG. 9*b* is a plan view of the hinge leaf of FIG. 9*a.*

Reference will now be made in detail to the present preferred embodiment of the invention, an example of which is illustrated in the accompanying drawings.

DETAILED DESCRIPTION OF THE PREFERRED EMBODIMENT

Referring now to the drawings, FIG. 1 depicts a medicine cabinet body constructed in accordance with the present invention and generally designated by the numeral 10. The cabinet body 10 has a generally rectangular box configuration and includes rectangular top and bottom surfaces 12 and 14 respectively. The top and bottom surfaces 12,14 are disposed in spaced parallel relationship to each other and are joined at their opposite longitudinal ends by a pair of spaced parallel rectangular side surfaces 16 and 18, the side surfaces 16,18 being disposed in substantially perpendicular relationship to the top and bottom surfaces 12,14. A rear surface 20 extends in a plane generally perpendicular to each of the top, bottom and side surfaces (12,14,16,18), joining all of the cabinet body surfaces to form an open box type closure. A front opening 22 extends between the top, bottom and side surfaces (12,14,16,18) in generally parallel spaced relationship to the rear surface 20.

FIG. 1 further shows that the cabinet body 10 has two pairs of hinge leaves secured to the top and bottom surfaces 12,14. The first hinge leaf pair is disposed on the left hand side of FIG. 1 and includes a hinge leaf 24 securely fastened to the top surface 12, and an identical second hinge leaf 26 secured to the bottom surface 14. The top hinge leaf 24, the details of which are illustrated in FIGS. 7A and 7B, defines an aperture 28 which is vertically aligned with an aperture 30 in the bottom hinge leaf 26. The second illustrated pair of hinge leaves is disposed on the right hand side of FIG. 1 and includes a hinge leaf 32 mounted to the top surface 12 and an identical hinge leaf 34 secured to the bottom surface 14. Hinge leaf 32, the details of which are illustrated in FIGS. 9A and 9B, includes two spaced apertures 36 and 38 which are vertically aligned with similarly spaced apertures 40 and 42 respectively formed in hinge leaf 34.

FIG. 1 also depicts five apertures extending through the rear surface 20 for use in securing the cabinet body 10 to a vertical mounting surface. One of the apertures 44 has a single keyhole configuration and is positioned in approximately the center of rear surface 20. The illustrated remaining apertures 46,48,50 and 52 have double keyhole configurations and are offset from the center aperture 44, with each of these remaining offset apertures being disposed proximal to one of the four corners of the rear surface 20. As will be apparent from the description that follows, it is important to one aspect of the invention that the center aperture 44 have a single keyhole configuration. However, the remaining apertures may be either of the single or double keyhole type.

The hinge leaf 24 is shown in greater detail in FIG. 2 where a closure member, specifically illustrated as a mirrored door 54 is being mounted to the cabinet body 10. The door 54 includes a mounting means in the form of a hinge leaf 56, which hinge leaf 56 is adjustably mounted on the top portion of the door 54 with a pair of screws 55. The hinge leaf 56 includes a securement portion 56A, through which the screws 55 extend. The securement portion 56A supports an elevated portion 56C through a riser portion 56B. A lateral extension 56D orthogonally joins the elevated portion 56C at the one end and supports an offset portion 56E at the other end. A mounting pin 58 depends downwardly from the offset portion 56E. As will be apparent from FIG. 2, the mounting pin 58 is designed for removable insertion into aperture 28 of hinge leaf 24 to pivotally mount the door 54 with respect to the cabinet body 10. Offsetting the portion 56E from the adjoining lateral extension 56D minimizes the contacting surface area between the hinge leaves 56 and 24 when the mounting pin 58 is inserted in aperture 28 and allows the door 54 to swing more easily.

As shown in FIG. 3, a further mounting means in the form of a hinge leave 60 is adjustably secured to the bottom of the door 54 with a pair of screws 61. The hinge leave 60, has an offset lateral extension 60B extending from a securement portion 60A. The offset extension 60B supports a downwardly depending mounting pin 62. The hinge leaves 56 and 60 are adjustable on the door 54 to permit movement between the door 54 and the door's pivotal axis, which pivotal axis is defined by coaxial mounting pins 58 and 62. As suggested by the FIG. 3 illustration, the bottom mounting pin 62 is removably insertable into aperture 30 of hinge leaf 26 where it is held against inadvertent removal by a pair of push nuts 63.

In the preferred embodiment, mounting pin 58 is approximately 1/16" longer than mounting pin 62. This disparity in mounting pin lengths enables the mirrored door 54 to be installed by first inserting the top pin 58 into the top aperture 28, and holding the top pin in the top aperture 28 while the bottom mounting pin 62 is being directed into the bottom aperture 30. Successively inserted the pins 58,62 into the apertures 28,30 in this manner is significantly easier than simultaneously inserting both pins 58,62 into both apertures 28,30. Since the bottom mounting pin 62 is shorter than the top mounting pin 58, securing the bottom pin 62 against dislodgement from aperture 30 also prevents dislodgement of mounting pin 58 from aperture 38. Hence, it is not necessary to use push nuts to secure the top pin 58 in aperture 28. Also, in normal use, the push nuts 63 are hidden from view on pin 62, whereas they would be readily visible on pin 58.

Turning now to FIG. 4, two additional closure members, mirrored doors 64 and 66, are shown for selectively closing the front opening 22 of cabinet body 10. The mirrored door 64 includes a mounting means, specifically illustrated as a hinge leaf 68 secured to its top surface. The hinge 68 is identical to top hinge 56 for door 54 and includes an elevated portion 68C supported by a riser 68B. The riser 68B extends from a securement 68A adjustably held to the door 64 by a plurality of screws 69. A lateral extension 68D extends from the elevated portion 68C and supports an offset portion 68E. A mounting pin 70 depends downwardly from the offset portion 68E and is adapted for insertion into aperture 36 of hinge leaf 32, which hinge leaf 32 is secured to the top cabinet body surface 12.

The mirrored door 66 includes a hinge leaf 74 secured to its top surface. The hinge leaf 74 is a mirror image of hinge leaf 68 in that it is identical except that the lateral extension extends in an opposite direction. Specifically, the hinge leaf 74 includes an elevated portion 74C with a lateral extension 74D. The elevated portion 74C is supported by a riser portion 74B connected to a securement portion 74A. Screws 77 extend through apertures in the securement portion 74A to secure the leaf hinge 74 to the door 66. A mounting pin 76 extends downwardly from an offset portion 74E for insertion into aperture 38 of hinge leaf 32. In the illustration of FIG. 4, the door 66 is shown after the mounting pin 76 has been pivotally mounted in aperture 38 and after a substantially coaxial mounting pin (not illustrated, but depending downwardly from a hinge leaf which is the mirror image of hinge leaf 60) secured to the bottom of the door 66 has been inserted into aperture 42 of hinge leaf 34. When so mounted, the door 66 is pivotally movable to selectively close a portion of the front opening 22. The nonillustrated hinge leaf at the bottom of door 66 is a mirror image of the hinge 60 of FIG. 3.

The details of the preferred hinge leaves for pivotally securing the closure members 54,64 and 66 to the cabinet body 10 are more clearly depicted in FIGS. 5 and 7–9. Referring now to FIG. 5, it is seen that the elongated securement portion 56A of hinge leaf 56 has a pair of elongated apertures 59. The apertures 59 receive the screws 55 (FIG. 2) and are elongated to provide adjustment of the door 54 toward and away from the pivotal axis defined by mounting pin 58. In this way, the position of door 54 may be varied to avoid binding of the door during pivotal movement about the rotational axis. The obliquely oriented riser section 56B joins the elevated leaf portion 56C with the securement portion 56A to permit positioning the hinge leaf 24 in the vertical space between the elevated hinge portion 56E and the door 54. The door 54 may thus be positioned closely to cabinet body 10 without interfering with hinge 24 during the door's (54) opening and closing movement. As noted above, the mounting pin 58 depends from an offset portion 56E joined to the lateral extension 56D to minimize the contact area between the hinge leaves 56 and 24.

As also indicated from FIG. 5A, the mounting pin 58 has a head portion 58A. This head portion 58A is permanently secured to the leaf portion 56E as the pin is inserted through an aperture 56E in the lateral extension portion 56E. Hinge leaf 68 is identical to hinge leaf 56 and hinge leaf 74 is a mirror image of hinge leaf 56. In other words, hinge leaf 74 is identical to hinge leaf 56 except that the lateral extension 74B extends in a direction opposite to he direction of lateral extension 56B.

Hinge leaf 60, as illustrated in FIG. 8A and 8B is similar to leaf 56 except that leaf 60 is substantially planar (with the exception of offset portion 60B). Since mounting pin 62 also extends downwardly, the hinge leaf 26 is disposed beneath the door 54 and there is no need for clearance in the space between the hinge 60 and the door 54.

FIGS. 6A and 6B depict one of the push nuts 63 used to hold the mounting pin 62 in aperture 30 against inadvertent removal. Each push nut 63 is of conventional design and includes a star shaped central aperture defined by a plurality of radially extending projections 57A. When forced on the mounting pin 62, these projections deflect and exert a compressive force against the pin 62.

It will be appreciated that the above described medicine cabinet assembly has significant installation advantages over prior art medicine cabinets. Significantly, the cabinet body 10 may be installed on a vertical surface without the doors 54,64 and 66. These doors 54,64 and 66 are easily and readily installable after the cabinet body 10 is precisely positioned, aligned and secured to the vertical surface. Thus, the problems encountered by the installer due to the weight of the cabinet assembly are substantially eliminated. Furthermore, by providing a plurality of doors, it is never necessary for the installer to lift any heavy components.

In order to install the cabinet assembly of the invention to a vertical wall surface, the desired center location of the assembly is first determined. Preferably, the desired cabinet height is determined by holding one of the doors 54,64 or 66 (detached from the cabinet body 10) to the desired vertical surface and marking on the vertical surface the height of the center of the door. The center of a vanity positioned beneath the cabinet assembly or some other desired horizontal location is then determined and marked, with the intersection of these two marks being used to determine the center of the cabinet assembly. Once the cabinet assembly center is determined, a hole is drilled in the wall or other vertical surface at this center location. After first inserting a plastic anchor into the wall at the center location, a screw 80 (FIG. 1) is driven into the anchor to within approximately ⅛" of the wall. The cabinet body is then mounted on this center screw 80 by directing the head of the partially inserted screw 80 through the center single keyhole aperture 44 in the rear surface 20. The screw 80 is then tightened until the head thereon contacts the rear surface 20. The cabinet is then leveled by pivoting the body 10 about the center screw as suggested by arrows 82 in FIG. 1. Significantly, the cabinet body 10 may be leveled with virtually all of the weight of cabinet body 10 being supported upon screw 80. When the cabinet body 10 is satisfactorily leveled, locations for the four remaining mounting screws are then drilled through the apertures 46,48,50 and 52 and the screws are inserted therein. When the screws through these apertures 46,48,50 and 52 are firmly fastened, the cabinet body 10 is firmly secured to the vertical wall surface. Most significantly, the cabinet body 10 is relatively lightweight without the doors 54,64 and 66, and the doors need not be installed until after the cabinet body is secured.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method of installing a medicine cabinet having a cabinet body formed of top, bottom, side and rear surfaces; first and second body hinge leaves secured to the top and bottom surfaces of said cabinet body, each of said body hinge leaves defining a pin receiving aperture; a closable member removably attached to the cabinet body, said cabinet body further including a pin mounting hinge leaf secured to each of its top and bottom portions and spaced in correspondency with said first and second body hinge leaves with each of the pin mounting leaves supporting a downwardly depending mounting pin which coaxially aligned with the mounting pin of the other pin mounting leaf, the mounting pin on one of said mounting hinge leaves being longer than the mounting pin of the other mounting pin leaf; said cabinet body further including a center keyhole aperture extending through the center of the rear surface and a plurality of off-center apertures extending through the rear surface at locations offset from the keyhole aperture, said method comprising the steps of:

(a) partially inserting a mounting screw with a head on its axial outboard end into a vertical wall at a predetermined position so that the head of the mounting screw is spaced from the wall;

(b) hanging the cabinet body on the partially inserted mounting screw by inserting the head of the mounting screw through the center keyhole aperture and positioning the rear cabinet body surface between the screw head and the wall;

(c) leveling the cabinet member by rotating the cabinet body about the rotational axis of the mounting screw disposed within the center keyhole aperture and thereafter inserting a screw into the vertical wall through at least one of the off-center apertures; and (d) thereafter tightening the screws in the center keyhole in at least one of the off-center apertures to secure the cabinet body to the vertical wall;

(e) partially inserting the longer of said mounting pins in one of said pin receiving apertures only after the cabinet body is secured to the wall;

(f) thereafter partially inserting the shorter of said mounting pins into the other of said pin receiving apertures; and (g) simultaneously advancing each of the mounting pins further into their respective pin receiving apertures to bring each of the pin mounting hinges into contact with said body hinge leaves.

2. A method as recited in claim 1 further including the step of securing the shorter of the two mounting pins against dislodgement from the aperture through which it is inserted.

* * * * *